US012603931B2

(12) United States Patent
Pang et al.

(10) Patent No.: US 12,603,931 B2
(45) Date of Patent: Apr. 14, 2026

(54) METHODS AND SYSTEMS FOR ENCODER PARAMETER SETTING OPTIMIZATION

(71) Applicant: Google LLC, Mountain View, CA (US)

(72) Inventors: Ching Yin Derek Pang, San Jose, CA (US); Kyrah Felder, Kennesaw, GA (US); Akshay Gadde, Fremont, CA (US); Paul Wilkins, Cambridge (GB); Cheng Chen, Milpitas, CA (US); Yao-Chung Lin, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/403,659

(22) Filed: Jan. 3, 2024

(65) Prior Publication Data

US 2024/0137400 A1 Apr. 25, 2024

Related U.S. Application Data

(63) Continuation of application No. 17/462,591, filed on Aug. 31, 2021, now Pat. No. 11,870,833.

(51) Int. Cl.
*H04L 65/70* (2022.01)
*G06N 20/00* (2019.01)
(Continued)

(52) U.S. Cl.
CPC ............. *H04L 65/70* (2022.05); *G06N 20/00* (2019.01); *H04L 65/61* (2022.05); *H04L 65/80* (2013.01); *H04N 21/251* (2013.01)

(58) Field of Classification Search
CPC ......... H04L 65/70; H04L 65/61; H04L 65/80; H04N 21/251; G06N 20/00
See application file for complete search history.

(56) References Cited

U.S. PATENT DOCUMENTS

2007/0154173 A1* 7/2007 Kim ................. H04N 21/42661
386/302
2011/0243223 A1* 10/2011 Nilsson ................ H04N 19/127
375/240.07
(Continued)

FOREIGN PATENT DOCUMENTS

KR 20220068880 A 5/2022

OTHER PUBLICATIONS

Zhang, et al, "Intelligent Security Inspection System And Method Of Human-machine Mixing Decision", Jul. 29, 2022, CN 114814973 (English Translation), pp. 1-34 (Year: 2022).*
(Continued)

*Primary Examiner* — Jonathan A Bui
(74) *Attorney, Agent, or Firm* — Lowenstein Sandler LLP

(57) ABSTRACT

A media item to be provided to users of a platform is identified. The media item is associated with a media class of one or more media classes. An indication of the media item is provided as input to a machine learning model trained based on historical encoding data to predict, for a given media item, a set of encoder parameter settings that satisfy a performance criterion in view of a respective media class of the given media item. The historical encoding data includes a prior set of encoder parameter settings that satisfied the performance criterion with respect to a prior media item associated with the respective class. Encoder parameter settings that satisfy the performance criterion in view of the media class is determined based on an output of the model. The media item is caused to be encoded using the determined encoder parameter settings.

20 Claims, 6 Drawing Sheets

(51) Int. Cl.
    *H04L 65/61*         (2022.01)
    *H04L 65/80*         (2022.01)
    *H04N 21/25*         (2011.01)

(56)             References Cited

U.S. PATENT DOCUMENTS

| | | | |
|---|---|---|---|
| 2013/0128947 A1* | 5/2013 | Fryer | H04N 21/2402 |
| | | | 375/E7.026 |
| 2013/0279565 A1* | 10/2013 | Nilsson | H04N 19/115 |
| | | | 375/240.02 |
| 2017/0359580 A1* | 12/2017 | Su | H04N 19/179 |
| 2019/0182512 A1* | 6/2019 | Bhooi | H04N 21/4402 |
| 2019/0335192 A1 | 10/2019 | Otto et al. | |
| 2020/0130177 A1* | 4/2020 | Kolouri | G06N 3/084 |
| 2020/0143045 A1* | 5/2020 | Joye | G06F 21/75 |
| 2020/0145692 A1* | 5/2020 | Xu | H04N 19/105 |
| 2020/0151611 A1* | 5/2020 | McGavran | G09B 29/102 |
| 2020/0195934 A1 | 6/2020 | Xing et al. | |
| 2021/0015417 A1* | 1/2021 | Harper | G10L 25/63 |
| 2021/0092493 A1* | 3/2021 | Codenie | H04H 60/372 |
| 2021/0201195 A1* | 7/2021 | Vengertsev | G06N 3/08 |
| 2021/0360233 A1* | 11/2021 | Ishtiaq | H04L 65/764 |
| 2022/0012795 A1* | 1/2022 | Vannoni | G06Q 30/0633 |
| 2022/0337883 A1* | 10/2022 | Grois | H04N 19/124 |
| 2023/0007298 A1* | 1/2023 | Amirpour | H04N 21/8456 |
| 2023/0048189 A1* | 2/2023 | Boddeti | H04W 12/37 |

OTHER PUBLICATIONS

Extended European Search Report Serial No. 22183329.6, dated Dec. 15, 2022, 8 pages.

\* cited by examiner

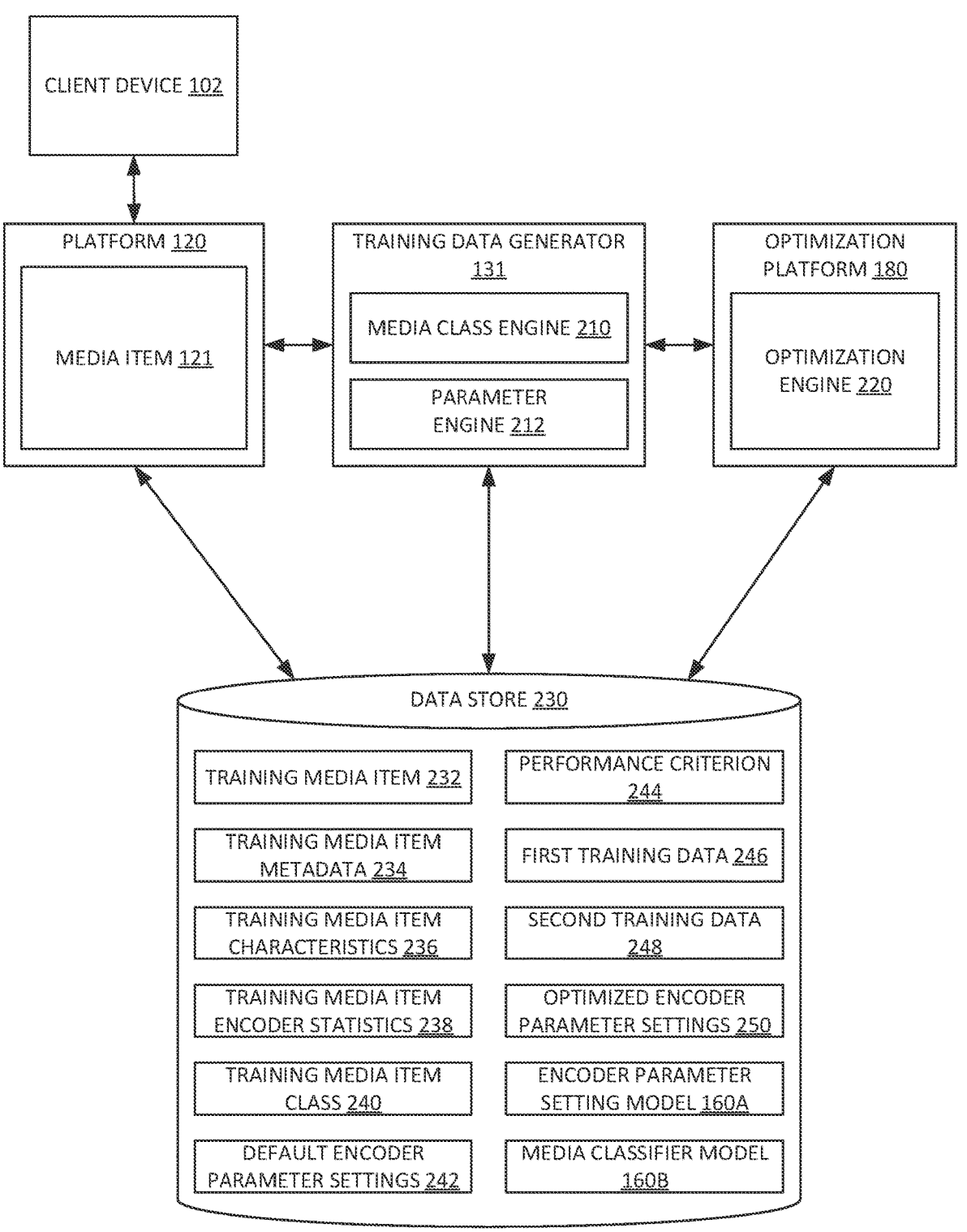

CLIENT DEVICE 102

PLATFORM 120

MEDIA ITEM 121

TRAINING DATA GENERATOR 131

MEDIA CLASS ENGINE 210

PARAMETER ENGINE 212

OPTIMIZATION PLATFORM 180

OPTIMIZATION ENGINE 220

DATA STORE 230

TRAINING MEDIA ITEM 232

TRAINING MEDIA ITEM METADATA 234

TRAINING MEDIA ITEM CHARACTERISTICS 236

TRAINING MEDIA ITEM ENCODER STATISTICS 238

TRAINING MEDIA ITEM CLASS 240

DEFAULT ENCODER PARAMETER SETTINGS 242

PERFORMANCE CRITERION 244

FIRST TRAINING DATA 246

SECOND TRAINING DATA 248

OPTIMIZED ENCODER PARAMETER SETTINGS 250

ENCODER PARAMETER SETTING MODEL 160A

MEDIA CLASSIFIER MODEL 160B

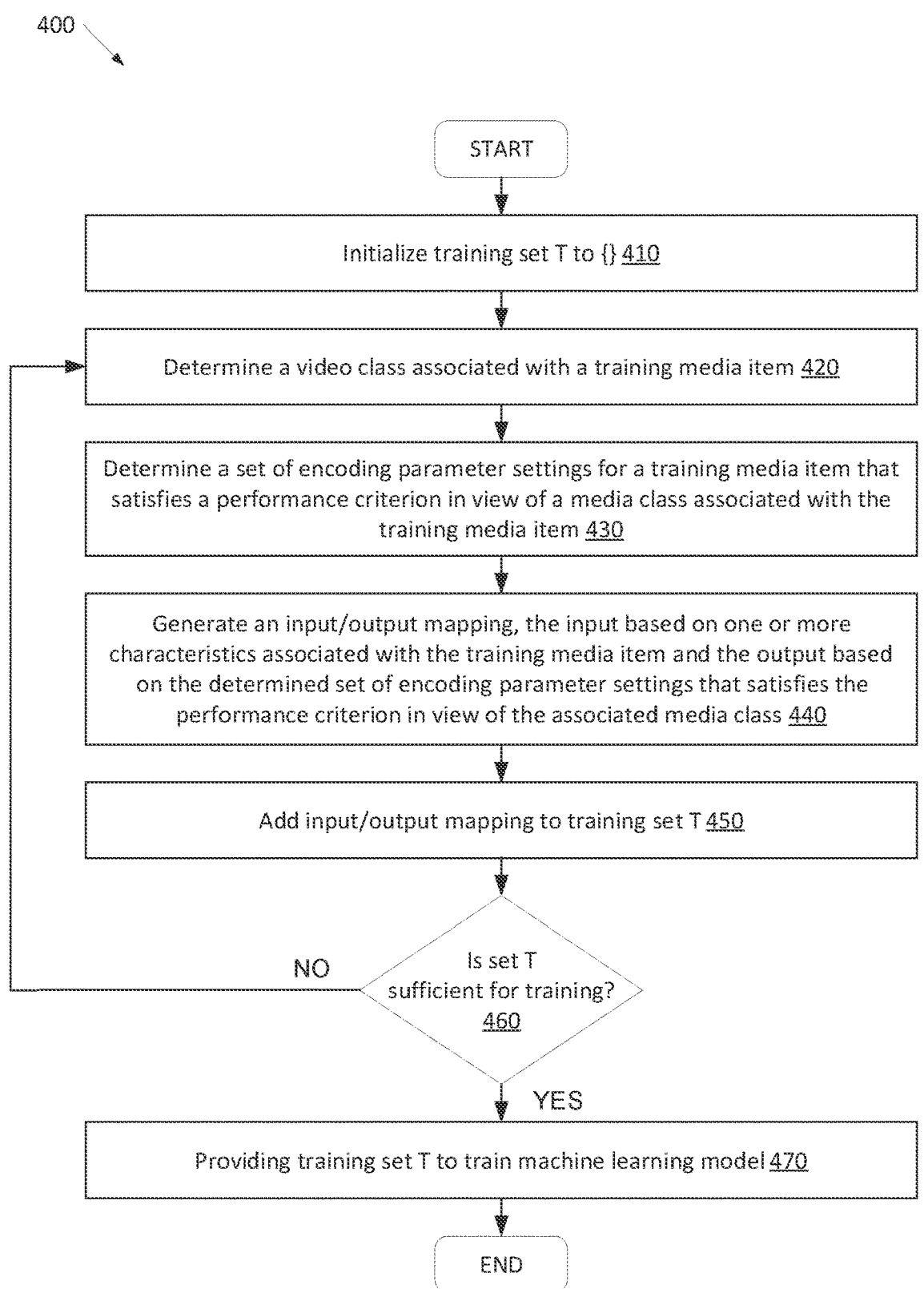

START

Initialize training set T to {} 410

Determine a video class associated with a training media item 420

Determine a set of encoding parameter settings for a training media item that satisfies a performance criterion in view of a media class associated with the training media item 430

Generate an input/output mapping, the input based on one or more characteristics associated with the training media item and the output based on the determined set of encoding parameter settings that satisfies the performance criterion in view of the associated media class 440

Add input/output mapping to training set T 450

NO    Is set T sufficient for training? 460

YES

Providing training set T to train machine learning model 470

END

FIG. 4

500

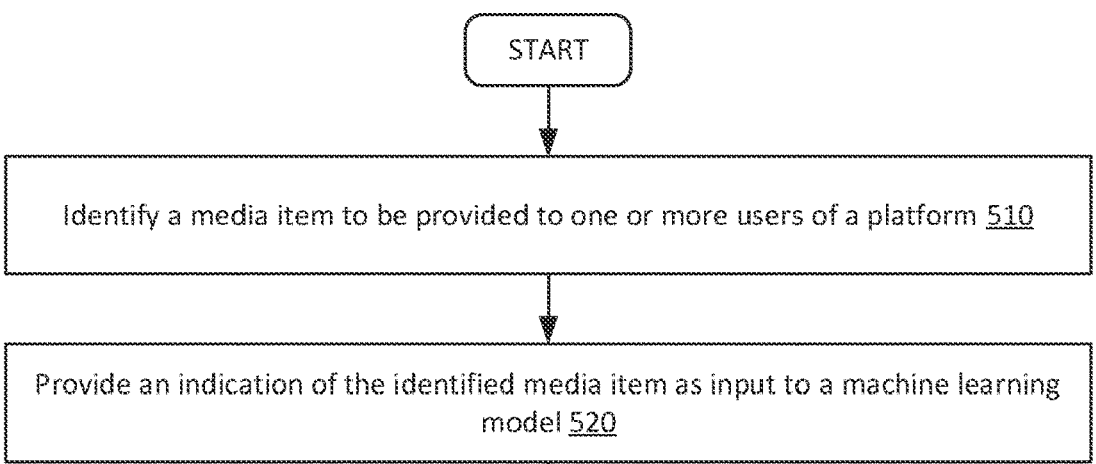

START

Identify a media item to be provided to one or more users of a platform 510

Provide an indication of the identified media item as input to a machine learning model 520

Obtain one or more outputs of the machine learning model, wherein the one or more obtained outputs of the machine learning model include:
- encoder data identifying one or more sets of encoder parameter settings, and
- for each of the one or more sets of encoder parameter settings, an indication of a level of confidence that a respective set of encoder parameter settings satisfies a performance criterion in view of the particular media class associated with the identified media item 530

Identify, based on the one or more outputs, the respective set of encoder parameter settings associated with a level of confidence that satisfies a confidence criterion 540

Cause the identified media item to be encoded using the respective set of encoder parameter settings 550

FIG. 5

METHODS AND SYSTEMS FOR ENCODER PARAMETER SETTING OPTIMIZATION

CROSS-REFERENCE TO RELATED APPLICATIONS

The present application is a continuation of application Ser. No. 17/462,591, filed Aug. 31, 2021, entitled "METHODS AND SYSTEMS FOR ENCODER PARAMETER SETTING OPTIMIZATION," which is incorporated by reference herein.

TECHNICAL FIELD

Aspects and implementations of the present disclosure relate to methods and systems for encoder parameter setting optimization.

BACKGROUND

A platform (e.g., a content sharing platform) can transmit (e.g., stream) media items to client devices connected to the platform via a network. The platform can encode audio signals and/or video signals associated with a media item using an encoder (e.g., a codec) while or before the media item is transmitted to a client device (e.g., to reduce the amount of data transmitted via the network, etc.). The client device can decode the received audio signals and/or video signals using a decoder before the media item is provided to a user associated with the client device (e.g., via a UI of the client device). One or more encoder parameter settings applied to the encoder can impact an amount of network bandwidth that is consumed by the transmitted encoded audio signals and/or encoded video signals, a network speed associated with transmitting the encoded audio signals and/or encoded video signals, and/or a quality of media item playback via the client device that receives the encoded audio signals and/or encoded video signals.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some implementations, a system and method are disclosed for encoder parameter setting optimization. In an implementation, a media item to be provided to one or more users of a platform is identified. The media item is associated with a media class. An indication of the identified media item is provided as input to a first machine learning model. The first machine learning model is trained to predict, for a given media item, a set of encoder parameter settings that satisfy a performance criterion in view of a respective media class associated with the given media item. One or more outputs of the first machine learning model are obtained. The one or more obtained outputs include encoder data identifying one or more sets of encoder parameter settings and, for each of the sets of encoder parameter settings, an indication of a level of confidence that a respective set of encoder parameter settings satisfies the performance criterion in view of the media class associated with the identified media item.

The identified media item is encoded using the respective set of encoding parameter settings associated with the level of confidence that satisfies a confidence criterion.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 2 is a block diagram illustrating a platform, a training data generator, and an optimization platform, in accordance with implementations of the present disclosure.

FIG. 4 depicts a flow diagram of a method for training a machine learning model to predict an optimized set of encoder parameter settings, in accordance with implementations of the present disclosure.

FIG. 5 depicts a flow diagram of a method obtaining an optimized set of encoder parameter settings for a media item to be shared with one or more users of a platform, in accordance with implementations of the present disclosure.

DETAILED DESCRIPTION

Figure 1:
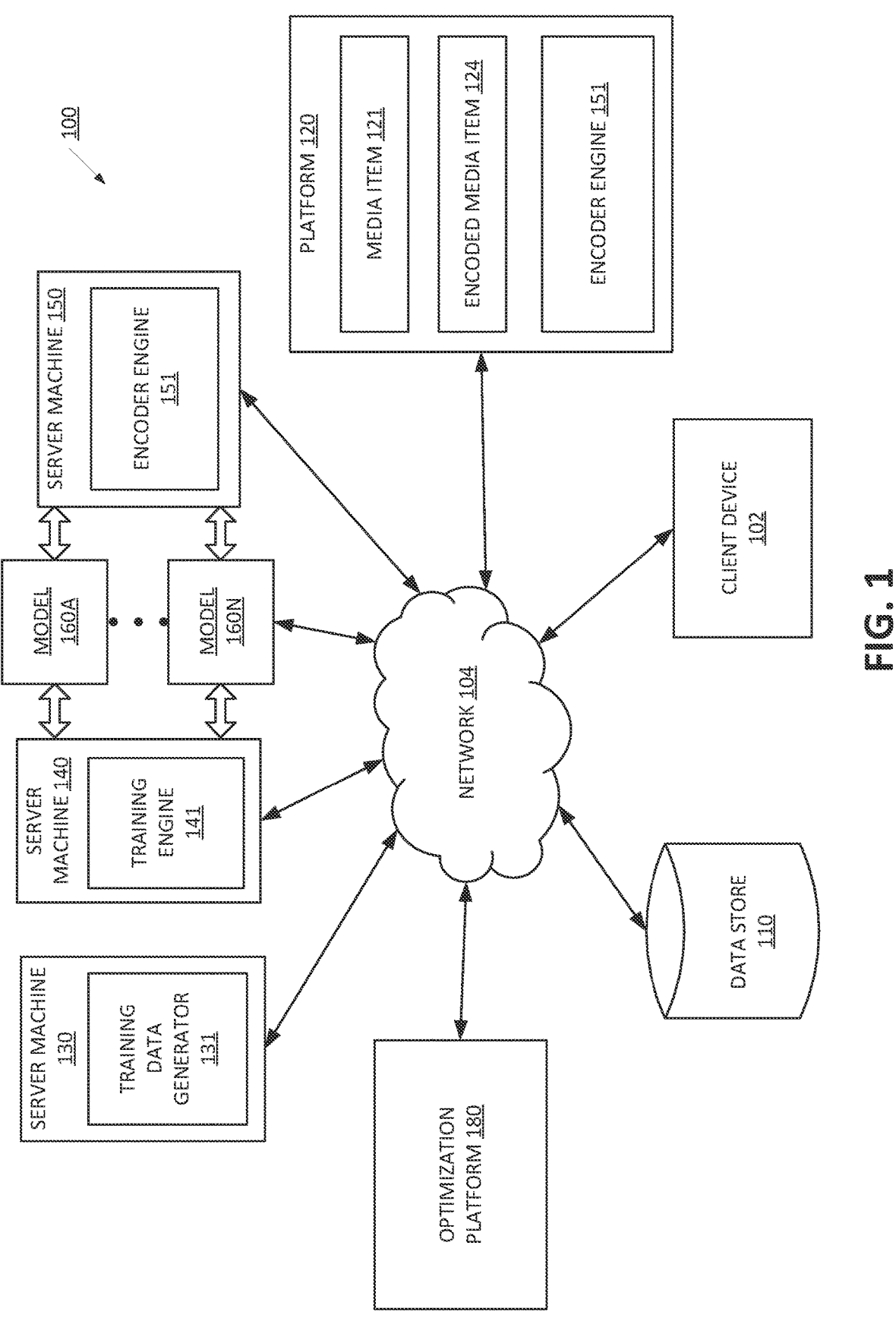
FIG. 1 illustrates an example system architecture, in accordance with implementations of the present disclosure.

Aspects of the present disclosure relate to methods and systems for encoder parameter setting optimization. A platform (e.g., a content sharing platform, etc.) can enable a user to access a media item (e.g., a video item, an audio item, etc.) provided by another user of the content sharing platform (e.g., via a client device connected to the content sharing platform). For example, a client device associated with a first user of the content sharing platform can generate the media item and transmit the media item to the conference platform via a network. A client device associated with a second user of the content sharing platform can transmit a request to access the media item and the content sharing platform can provide the client device associated with the second user with access to the media item (e.g., by transmitting the media item to the client device associated with the second user, etc.) via the network.

In some embodiments, the platform can encode one or more data streams or signals associated with a media item before or while the platform provides access to the media item. For example, an encoder (e.g., a codec) associated with the content sharing platform can encode video signals and/or audio signals associated with a video item before or while the content sharing platform provides a client device with access to the media item. In some instances, an encoder can refer to a device at or coupled to a processing device associated with the content sharing platform. In other or similar instances, an encoder can refer to a software program running on a processing device associated with the platform, or another processing device that is connected to a processing device associated with the platform (e.g., via the network). The encoder can be configured to encode one or more data streams or signals associated with a media item to create one or more encoded data streams or signals. The encoder can encode the one or more data streams or signals by restructuring or otherwise modifying the one or more data streams or signals to reduce a number of bits configured to represent data associated with a media item. Accordingly, the one or more encoded data streams or signals can be a compressed version of (i.e., have a smaller size than) the one or more data streams or signals.

A client device connected to the platform (e.g., the content sharing platform) can be associated with an encoder and/or a decoder. A decoder can refer to a device at or coupled to the client device or a software program running on a processing device associated with the client device or coupled to the client device, as described above. In response to receiving one or more encoded data streams or signals from the platform, the client device can provide the one or more encoded data streams or signals to the encoder and/or decoder to generate a decoded version of the one or more encoded data streams or signals. In some embodiments, the decoded version of the one or more encoded data streams or signals can correspond to the one or more data streams or signals before the one or more data streams or signals are encoded by the associated with the platform. The client device can provide the media item to a user associated with the client device based on the one or more decoded data streams or signals.

An encoder (e.g., associated with a platform, associated with a client device, etc.) can operate according to a set of encoder parameter settings. Each of the set of encoder parameter settings can impact a size of an encoded data stream or signal and/or an overall quality of a media item after the encoded data stream or signal is decoded (e.g., at or by the client device). The impact of a set of encoder parameter settings for a media item can depend on one or more characteristics associated with the media item. For example, a first video item hosted by the platform can be associated with an action movie and a second video item hosted by the platform can be associated with a meditation video. If the encoder encodes data streams or signals associated with the first video item and the second video item according to the same set of encoder parameter settings, a size of an encoded data stream or signal associated with the first video item may be different (e.g., larger) than a size of an encoded data stream or signal associated with the second video item, in some instances. In additional or alternative instances, an overall quality of the first video item after the encoded data stream or signal is decoded at or by a client device can be different (e.g., worse) than an overall quality of the second video item after the encoded data stream or signal is decoded at or by the client device.

A platform can host a large number of media items (e.g., hundreds of thousands, millions, billions, etc.). The platform can be associated with one or more operating or performance conditions that are to be satisfied in order for the platform to effectively and efficiently serve each request for a respective media item. In some instances, the one or more operating or performance conditions can correspond to a speed at which a media item is provided to a requesting client device and/or an overall quality of a media item that is provided to a user associated with a requesting client device.

In conventional systems, an encoder associated with a platform may encode each data stream or signal associated with each media item hosted by the platform using the same set of encoder parameter settings. However, each media item hosted by the platform can be associated with one or more distinct characteristics (e.g., distinct image characteristics, a type of content associated with a respective media item, etc.) which can impact a size of an encoded data stream or signal that is generated by the encoder, a speed associated with transmitting the encoded data stream or signal via a network, a speed associated with transmitting encoded data streams or signals associated with other media items via the network, and/or an overall quality of the media item after the encoded data stream or signal is decoded. In accordance with the previously provided example, the size of the encoded data stream or signal associated with the first video item, which is encoded using the same set of encoder parameter settings used to encode the data stream or signal associated with the second video item, may be large and therefore may consume a significant amount of computing resources (e.g., network bandwidth) as the encoded data stream or signal is transmitted to a client device. However, if the encoder encodes the data stream or signal associated with the first video item using a different set of parameter settings, the size of the encoded data stream or signal may be significantly smaller, which may not consume a significant amount of computing resources.

In another example, as indicated above, after a data stream or signal associated with the first video item is encoded using the same encoder parameter settings used to encode the data stream or signal associated with the second video item, the quality of the first video item after the encoded data stream or signal is transmitted to and decoded at a client device can be rather low. The client device and/or the platform may consume a significant amount of computing resources to improve the data stream or signal associated with the first video item for presentation to a user associated with the client device. However, if the encoder encodes the data stream or signal associated with the first video item using a different set of parameter settings, the quality of the decoded data stream or signal may be higher, which may not consume a significant amount of computing resources. In some instances, the efforts to improve a data stream or signal can be unsuccessful and the client device may not be able to provide the user with access to the first video item. In other instances, the client device may transmit another request to the platform for the first media item, which can consume even more computing resources. By consuming a significant amount of computing resources, a fewer amount of computing resources are available for other processes associated with the platform, which can increase an overall latency and decrease an overall efficiency associated with the platform. The decreased overall efficiency and the increased overall latency may fail to satisfy the operating or performance conditions associated with the platform.

In some conventional systems, a platform can attempt to identify an optimal set of encoder parameter settings for a respective media item by encoding a data stream or signal associated with the respective media item several times using a distinct set of encoder parameter settings for each encoding and determining whether each encoded data stream or signal satisfies one or more performance criterions (e.g., a bit rate criterion, an encoding complexity criterion, etc.). However, given that each set of encoder parameter settings can include tens or hundreds of different parameter settings, the platform may encode a data stream or signal associated with a respective media item hundreds or thousands of times in order to identify an optimal set of encoder parameter settings for the respective media item. Each time that the data stream or signal is encoded and tested by the platform, computing resources can be consumed. As described above, a platform can host a large number of media items. Accordingly, encoding and testing data streams associated with each media item hosted by the platform can consume a substantial amount of computing resources, which can significantly increase system latency and decrease system efficiency, as described above. Other or similar conventional systems can use machine learning or artificial intelligence (AI) techniques to attempt to reduce the size of an encoded data stream or signal and/or improve a quality of a media item after the data stream or signal associated with the media item is decoded. However, such machine learning or AI techniques fail to identify an optimal set of encoder parameter settings that can be used by an encoder to encode a data stream or signal associated with a respective media item.

Implementations of the present disclosure address the above and other deficiencies by providing methods and systems for encoder parameter setting optimization. A platform (e.g., a content sharing platform) can host one or more media items (e.g., video items, audio items, etc.) to be provided to one or more users of the platform (e.g., via client devices associated with the one or more users). In some embodiments, a media item can correspond to a media file (e.g., a video file, and audio file, etc.). In other or similar embodiments, a media item can correspond to a portion of a media file (e.g., a portion or a chunk of a video file, an audio file, etc.). The platform can identify a media item that is to be provided to one or more users of the platform and can provide an indication of the identified media item as input to a machine learning model. In some embodiments, the media item can be associated with a particular media class of a set of media classes. Each of the set of media classes can correspond to one or more distinct characteristics associated with a respective media item hosted by the platform, such as a distinct image characteristic associated with the respective media item (e.g., a spatial resolution associated with the respective media item, a frame rate associated with the media item, a motion activity associated with the media item, a type of device that generated the media item, an amount of image noise associated with the media item, an image texture complexity associated with the media item, a spatial complexity associated with the media item, etc.) and/or a content type associated with the respective media item. Accordingly, the media item can be associated with the particular media class in view of an image characteristic and/or a content type associated with the media item.

The machine learning model can be trained to predict, for a given media item, a set of encoder parameter settings that satisfy a performance criterion in view of a respective media class associated with the given media item. A performance criterion can refer to a bit rate savings performance criterion, a peak signal-to-noise ratio (PSNR) criterion, a structural similarity index (SSIM) criterion, a perceptual media quality criterion, and/or a psychovisual similarity criterion. In some embodiments, the machine learning model can be trained using a set of training media items. For example, the platform can determine a set of encoder parameter settings for a respective training media item that satisfies a performance criterion in view of a particular media class associated with the respective training media item. The platform can determine the set of encoder parameter settings that satisfies the performance criterion by providing the training media item, one or more characteristics (e.g., an image characteristic, a content type etc.) associated with the training media item, an indication of a default set of encoder parameter settings, and an indication of the performance criterion to an optimization platform. The optimization platform can include an optimization engine that is configured to optimize a set of parameters associated with a given object in view of a given performance criterion. The optimization engine can identify one or more optimization algorithms associated with optimizing the set of encoder parameter settings for the training media item and can execute a series of experiments using the one or more optimization algorithms to determine the set of encoder parameter settings that satisfies the performance criterion in view of the one or more characteristics associated with the training media item. Responsive to completing the series of experiments, the optimization platform can provide, to the platform, an indication of the set of encoder parameter settings that satisfies the performance criterion. The platform can train the machine learning model using a training input including the one or more characteristics of the training media item and a target output or the training input that includes an indication of the set of encoder parameter settings that satisfies the performance criterion.

Responsive to providing the indication of the media item to be shared with one or more users of the platform as input to the trained machine learning model, the platform can obtain one or more outputs of the model. The one or more outputs can include encoder data identifying one or more sets of encoder parameter settings and, for each set of encoding parameter settings, an indication of a level of confidence that a respective set of encoder parameter settings satisfies a performance criterion (e.g., a bit rate savings performance criterion, a peak signal-to-noise ratio (PSNR) criterion, a structural similarity index (SSIM) criterion, a perceptual media quality criterion, and/or a psychovisual similarity criterion, etc.) in view of the particular media class associated with the media item. The platform can cause the media item to be encoded (e.g., by an encoder) using the respective set of encoder parameter settings associated with a level of confidence that satisfies a confidence criterion (e.g., exceeds a confidence threshold).

Aspects of the present disclosure provide a mechanism for identifying optimal encoder parameter settings for a respective media item in view of a particular media class associated with the media item. A media class can correspond to one or more characteristics (e.g., image characteristics, a content type, etc.) associated with a media item. A machine learning model can be trained to predict, for a given media item, a set of encoder parameter settings that satisfies a performance criterion (e.g., bit rate savings performance criterion, a peak signal-to-noise ratio (PSNR) criterion, a structural similarity index (SSIM) criterion, a perceptual media quality criterion, and/or a psychovisual similarity criterion, etc.) in view of a media class associated with the given media item. Training data used to train the model can be obtained using an optimization platform that is configured to determine optimized parameter settings associated with a process for a given object based on a given performance criterion. In response to receiving a media item, or receiving a request to access a media item, the platform can provide an indication of the media item as input to the trained machine learning model and can determine, based on one or more outputs of the model, a set of encoder parameter settings that satisfies a performance criterion in view of a media class associated with the media item. The platform can cause the media item to be encoded (e.g., by an encoder) using the determined set of encoder parameter settings.

Accordingly, embodiments of the present disclosure enable a platform to identify an optimized set of encoder parameter settings based on a media class associated with a media item. The platform can encode a data stream or signal associated with the media item using the identified set of encoder parameter settings such that the encoded data stream or signal is associated with a minimal size and a maximum overall quality of the media item after decoding the encoded data stream or signal. Accordingly, an amount of computing resources that are consumed for encoding, decoding, and providing a media item to a user of the platform is significantly reduced, which decreases an overall latency and increases an overall efficiency associated with the platform. The decreased overall latency and the increased overall efficiency can satisfy operating or performance conditions associated with the platform, in some embodiments.

FIG. 1 illustrates an example system architecture 100, in accordance with implementations of the present disclosure. The system architecture 100 (also referred to as "system" herein) includes one or more client devices 102, a data store 110, a platform 120 (e.g., a content sharing platform), one or more server machines 130-150, and an optimization platform 180, each connected to a network 104. In implementations, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. A data item can include audio data and/or video data, in accordance with embodiments described herein. Data store 110 can be hosted by one or more storage devices, such as main memory, magnetic or optical storage based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by platform 120 or one or more different machines (e.g., server machines 130-150) coupled to the platform 120 via network 104.

Client devices 102 can include one or more computing devices such as personal computers (PCs), laptops, mobile phones, smart phones, tablet computers, netbook computers, network-connected televisions, etc. In some implementations, client device 102 can also be referred to as a "user device." Client device 102 can include a content viewer. In some implementations, a content viewer can be an application that provides a user interface (UI) for users to view or upload content, such as images, video items, web pages, documents, etc. For example, the content viewer can be a web browser that can access, retrieve, present, and/or navigate content (e.g., web pages such as Hyper Text Markup Language (HTML) pages, digital media items, etc.) served by a web server. The content viewer can render, display, and/or present the content to a user. The content viewer can also include an embedded media player (e.g., a Flash® player or an HTML5 player) that is embedded in a web page (e.g., a web page that may provide information about a product sold by an online merchant). In another example, the content viewer can be a standalone application (e.g., a mobile application or app) that allows users to view digital media items (e.g., digital video items, digital images, electronic books, etc.). According to aspects of the disclosure, the content viewer can be a content sharing platform application for users to record, edit, and/or upload content for sharing on platform 120. As such, the content viewers can be provided to the client device 102 by platform 120. For example, the content viewers may be embedded media players that are embedded in web pages provided by the platform 120.

A media item 121 can be consumed via the Internet or via a mobile device application, such as a content viewer of client device 102. In some embodiments, a media item 121 can correspond to a media file (e.g., a video file, and audio file, etc.). In other or similar embodiments, a media item 121 can correspond to a portion of a media file (e.g., a portion or a chunk of a video file, an audio file, etc.). As discussed previously, a media item 121 can be requested for presentation to the user by the user of the platform 120. As used herein, "media," media item," "online media item," "digital media," "digital media item," "content," and "content item" can include an electronic file that can be executed or loaded using software, firmware or hardware configured to present the digital media item to an entity. In one implementation, the platform 120 can store the media items 121 using the data store 110. In another implementation, the platform 120 can store media item 121 or fingerprints as electronic files in one or more formats using data store 110. Platform 120 can provide media item 121 to a user associated with client device 102 by allowing access to media item 121 (e.g., via a content sharing platform application), transmitting the media item 121 to the client device 102, and/or presenting or permitting presentation of the media item 121 via client device 102.

In some embodiments, media item 121 can be a video item. A video item refers to a set of sequential video frames (e.g., image frames) representing a scene in motion. For example, a series of sequential video frames can be captured continuously or later reconstructed to produce animation. Video items can be provided in various formats including, but not limited to, analog, digital, two-dimensional and three-dimensional video. Further, video items can include movies, video clips or any set of animated images to be displayed in sequence. In some embodiments, a video item can be stored (e.g., at data store 110) as a video file that includes a video component and an audio component. The video component can include video data that corresponds to one or more sequential video frames of the video item. The audio component can include audio data that corresponds to the video data.

Platform 120 can include multiple channels (e.g., channels A through Z). A channel can include one or more media items 121 available from a common source or media items 121 having a common topic, theme, or substance. Media item 121 can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking," "following," "friending," and so on.

In some embodiments, system 100 can include one or more third party platforms (not shown). In some embodiments, a third party platform can provide other services associated media items 121. For example, a third party platform can include an advertisement platform that can provide video and/or audio advertisements. In another example, a third party platform can be a video streaming service provider that produces a media streaming service via a communication application for users to play videos, TV shows, video clips, audio, audio clips, and movies, on client devices 102 via the third party platform.

In some embodiments, a client device 102 can transmit a request to platform 120 for access to a media item 121. Encoder engine 151 of platform 120 can encode one or more data streams or signals associated with media item 121 before or while platform 120 provides client device 102 with access to the requested media item 121. Encoder engine 151 can include one or more encoders (e.g., codecs) that encode a data stream or signal in accordance with a set of encoder parameter settings. In some embodiments, an encoder parameter setting can impact a decision made by the encoder during an encoding process. For example, an encoder parameter setting can impact a rate control (e.g., how many bits to spend for a given frame) associated with encoding a data stream or a signal, a number of type of reference frames of the data stream or signal that are to be used to define future frames of the data stream or signal, a type of frame to be used to compress the data stream or signal, a mode associated with an encoding process, a maximum and/or minimum quality bounds per frame of the data stream or signal, and so forth. Encoder engine 151 can encode one or more data streams or signals associated with a requested media item 121 (represented as encoded media item 124, as illustrated in FIG. 1), in accordance with embodiments provided herein, and platform 120 can transmit the encoded media item 124 to client device 102. In some embodiments, client device 102 can include, or be coupled to, an encoder and/or a decoder that is configured to decode an encoded data stream or signal. Client device 102 can provide the one or more encoded data streams or signals associated with encoded media item 124 as input to the encoder and/or the decoder, which can decode the one or more encoded data streams or signals. The one or more decoded data streams or signals can correspond to requested media item 121. Client device 102 can provide requested media item 121 to a user associated with client device 102 based on the one or more decoded data streams or signals associated with requested media item 121 (e.g., via a UI of client device 102).

In some embodiments, encoding engine 151 can determine a set of encoder parameter settings to be used for encoding media item 121 using one or more machine learning models 160A-N. For example, encoding engine 151 can determine the set of encoder parameter settings using a trained encoder parameter setting machine learning model 160A. Machine learning model 160A can be trained to predict, for a given media item 121, a set of encoder parameter settings that satisfy a performance criterion in view of a media class, of a set of media classes, associated with the given media item. Each of the set of media classes can correspond to one or more distinct characteristics associated with a respective media item 121, such as an image characteristic associated with the respective media item (e.g., a spatial resolution, a frame rate, a motion activity, a type of device that generated media item 121, an amount of image noise associated with media item 121, an image texture complexity associated with media item 121, a spatial complexity associated with media item 121, etc.) and/or a content type associated with the respective media item 121. Accordingly, the given media item 121 can be associated with a particular media class in view of an image characteristic and/or a content type associated with the given media item 121. A performance criterion can refer to a bit rate savings performance criterion, a peak signal-to-noise ratio (PSNR) criterion, a structural similarity index (SSIM) criterion, a perceptual media quality criterion, and/or a psychovisual similarity criterion.

Training data generator 131 (i.e., residing at server machine 130) can generate training data to be used to train model 160. In some embodiments, training data generator 131 can generate the training data based on one or more training media items (e.g., stored at data store 110 or another data store connected to system 100 via network 104). In an illustrative example, data store 110 can be configured to store a first set of training media items and metadata associated with each of the set of training media items. In some embodiments, the metadata associated with a respective training media item can indicate a spatial resolution associated with the respective training media item, a frame rate associated with the respective training media item, a motion activity associated with the respective training media item, a type of device used to generate the training media item, an amount of noise (e.g., image noise, audio noise, etc.) associated with the training media item, an image texture complexity associated with the training media item, and/or a spatial complexity associated with the training media item. In other or similar embodiments, the metadata may only indicate the type of device used to generate the training media item and/or the amount of noise associated with the training media item. In some embodiments, each of the first set of training media items can be selected (e.g., by an operator of platform 120, by training data generator 131, etc.) for inclusion in the first set of training media items based on the one or more characteristics associated with the respective training media item. For example, an operator of platform 120, training data generator 131, etc. can select one or more of the first set of training media items based on a determination that each of the one or more first set of training media items are associated with a distinct spatial resolution.

In some embodiments, training data generator 131 can determine a media class associated with each of the first set of training media items. For example, training data generator 131 can obtain one or more characteristics associated with a given training media item and provide an indication of the one or more characteristics as input to a media class machine learning model 160B (also referred to as a media classifier model 160B herein). In some embodiments, training data generator 131 can obtain the one or more characteristics associated with the given training media item based on metadata associated with the given training media item. In other or similar embodiments, training data generator 131 can obtain the one or more characteristics by analyzing a data stream or a signal associated with the given training media item. For example, training data generator 131 can analyze a data stream or a signal associated with the given training media item to determine a spatial resolution associated with the given training media item, a frame rate associated with the given training media item, and/or a motion activity associated with the given training image.

Model 160B can be trained to predict, based on given input characteristics associated with a media item, a particular media class that corresponds to the media item, in view of the given input characteristics. In some embodiments, training data generator 131 can train model 160B based on characteristics associated with each of a second set of training media items (e.g., stored at data store 110 or another data store connected to system 100 via network 104). Each of the second set of training media items can be stored at data store 110, or the other data store, with metadata indicating one or more characteristics associated with each respective training media item. Further details regarding training model 160B are provided with respect to FIG. 2. Responsive to providing the one or more characteristics associated with a training media item of the first set of training media items as input to model 160B, training data generator 131 can obtain one or more outputs of model 160B. The one or more outputs of model 160B can include media item class data indicating an identifier associated with each of a set of media item classes and an indication of a level of confidence that the one or more given media item characteristics correspond to a respective media item class of the set of media item classes. Training data generator 131 can determine that a respective media item class corresponds to the media item of the first set of media items by determining that the level of confidence associated with the respective media item class satisfies a confidence criterion (e.g., satisfies a level of confidence threshold, is larger than the level of confidence associated with other media item classes of the set of media item classes, etc.).

In some embodiments, encoder parameter setting machine learning model 160A can be a supervised machine learning model. In such embodiments, training data used to train model 160A can include a set of training inputs and a set of target outputs for the training inputs. The set of training inputs can include an indication of a training media item of the first set of training media items and an indication of a media class associated with the training media item (e.g., determined by training data generator 131 using model 160B, as described above). In some embodiments, the set of training inputs can include additional data associated with the training media item. For example, training data generator 131 can encode the training media item by cause the encoder to encode a data stream or a signal associated with the training media item based on a default set of encoder parameter settings. The default set of encoder parameter settings can include one or more default encoder perimeter settings to be applied during an encoding process performed by the encoder. A default encoder parameter setting can refer to an encoder parameter setting that is specified, for example, by an operator of platform 120, in view of a specification associated with the encoder, etc. Responsive to encoding the training media item based on the default set of encoder parameter settings, training data generator 131 can generate one or more statistics associated with the encoded data stream or signal. Training data generator 131 can include the one or more statistics associated with the encoded data stream or signal with the set of training inputs. The set of target outputs can include an indication of a set of encoder parameter settings that satisfy a performance criterion in view of the media class associated with the training media item. Training data generator 131 can determine the set of encoder parameter settings that satisfy the performance criteria on in view of the media class associated with the training media item. In some embodiments, training data generator 131 can determine the set of encoder parameter settings using optimization platform 180. Further details regarding optimization platform 180 are provided with respect to FIG. 2.

In other or similar embodiments, encoder parameter setting machine learning model 160A can be an unsupervised machine learning model. In some embodiments, training data used to train model 160A can include a set of training inputs that include an indication of the training media item, an indication of the one or more characteristics associated with the training media item, and an indication of an optimized set of encoder parameter settings associated with the training media item. In some embodiments, training data generator 131 can obtain the indication of the optimized set of encoder parameter settings from optimization platform 180, in accordance with embodiments described with FIG. 2.

Server machine 140 may include a training engine 141. Training engine 141 can train a machine learning model 160A-N using the training data from training data generator 131. In some embodiments, the machine learning model 160A-N can refer to the model artifact that is created by the training engine 141 using the training data that includes training inputs and corresponding target outputs (correct answers for respective training inputs). The training engine 141 can find patterns in the training data that map the training input to the target output (the answer to be predicted), and provide the machine learning model 160A-N that captures these patterns. The machine learning model 160A-N can be composed of, e.g., a single level of linear or non-linear operations (e.g., a support vector machine (SVM or may be a deep network, i.e., a machine learning model that is composed of multiple levels of non-linear operations). An example of a deep network is a neural network with one or more hidden layers, and such a machine learning model can be trained by, for example, adjusting weights of a neural network in accordance with a backpropagation learning algorithm or the like. In other or similar embodiments, the machine learning model 160A-N can refer to the model artifact that is created by training engine 141 using training data that includes training inputs. Training engine 141 can find patterns in the training data, identify clusters of data that correspond to the identified patterns, and provide the machine learning model 160A-N that captures these patterns. Machine learning model 160A-N can use one or more of support vector machine (SVM), Radial Basis Function (RBF), clustering, supervised machine learning, semi-supervised machine learning, unsupervised machine learning, k-nearest neighbor algorithm (k-NN), linear regression, random forest, neural network (e.g., artificial neural network), etc.

Server 150 includes an encoder engine 151. As indicated above, encoder engine 151 can determine a set of encoder parameter settings to be used for encoding a media item 121 using one or more machine learning models 160A-N. In some embodiments, encoder engine 151 can provide an indication of the media item 121 as input to encoder parameter setting machine learning model 160A to obtain one or more outputs. In some embodiments, encoder engine 151 can also provide an indication of one or more characteristics associated with the media item 121 and/or a media class associated with the media item. Model 160A can provide one or more outputs that indicate a likelihood (e.g., a level of confidence) that a set of encoder parameter settings identified by the one or more outputs satisfies a performance criterion (e.g., a bit rate savings performance criterion, a peak signal-to-noise ratio (PSNR) criterion, a structural similarity index (SSIM) criterion, a perceptual media quality criterion, and/or a psychovisual similarity criterion, etc.) in view of the media class associated with the media item. In response to identifying a set of encoder parameter settings that is associated with a level of confidence that satisfies a confidence criterion (e.g., exceeds a threshold level of confidence, etc.), encoding engine 151 can encode the media item 121 using the identified set of encoder parameter settings, in accordance with previously described embodiments.

In some implementations, platform 120, server machines 130-150, and/or optimization platform 180 can operate on one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable a user to connect with other users via a conference call. In some implementations, the functions of platform 120, server machines 130-150, and/or optimization platform 180 may be provided by a more than one machine. For example, in some implementations, the functions of training data generator 131, training engine 141, and/or encoding engine 151 may be provided by two or more separate server machines. Content sharing platform 120, server machines 130-150, and/or optimization platform 180 may also include a website (e.g., a webpage) or application back-end software that may be used to enable a user to connect with other users via the conference call.

In general, functions described in implementations as being performed by platform 120 can also be performed on the client devices 102A-N in other implementations, if appropriate. In addition, the functionality attributed to a particular component can be performed by different or multiple components operating together. Content sharing platform 120 can also be accessed as a service provided to other systems or devices through appropriate application programming interfaces, and thus is not limited to use in websites.

It should be noted that although some embodiments of the present disclosure are directed to a content sharing platform, embodiments of this disclosure can be applied to other types of platforms. For example, embodiments of the present disclosure can be applied to a content archive platform, a content storage platform, etc.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline, such as a topic channel, of the platform 120.

In situations in which the systems discussed here collect personal information about users, or can make use of personal information, the users can be provided with an opportunity to control whether platform 120 collects user information (e.g., information about a user's social network, social actions or activities, profession, a user's preferences, or a user's current location), or to control whether and/or how to receive content from the content server that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the platform 120.

FIG. 2 is a block diagram illustrating a platform 120, a training data generator 131, and an optimization platform 180, in accordance with implementations of the present disclosure. As described with respect to FIG. 1, platform 120 can enable a user to access a media item 121 (e.g., a video item, an audio item, etc.) provided by another user of platform 120. Training data generator 131 can be configured to generate training data to be used to train an encoder parameter setting model (e.g., model 160A) and/or a media classifier model (e.g., model 160B). Training data generator 131 can include a media class engine 132 and/or a parameter engine 212, in some embodiments. Optimization platform 180 can be configured to identify an optimized set of parameters for a process associated with an object. In some embodiments, platform 120, training data generator 131, and/or optimization platform 180 can be connected to data store 230. Data store 230 can correspond to data store 110, in some embodiments. In other or similar embodiments, data store 230 can be another data store that is connected to system 100 (e.g., via network 104 or via another network).

As described above, in some embodiments, a client device 102 can generate a media item 121 and can transmit the media item 121 to platform 120. Content sharing platform 120 can store the media item 121 at data store 230, as described above. In some embodiments, platform 120 and/or training data generator 131 can designate the media item 121 to be used for training one or more machine learning models (e.g., model 160A, 160B, etc.) and store the media item 121 (and metadata associated with media item 121) at data store 230 as training media item 232. In some embodiments, platform 120 and/or training data generator 131 can designate the media item 121 to be a training media item 232 based on one or more characteristics associated with media item 121. For example, platform 120, training data generator 131, an operator of platform 120, etc. can determine one or more characteristics (e.g., an image characteristic, a content type, etc.) associated with media item 121, as described with respect to FIG. 1. The platform 120, training data generator 131, an operator of platform 120, etc. can select media item 121 to be designated as a training media item 232 by determining that the one or more characteristics associated with media item 121 satisfy a training data criterion associated with training one or more machine learning models. For instance, training data generator 131, etc. can select training media item 232 to be designated as training media item 232 by determining that a spatial resolution associated with media item 121 satisfies the training data criterion.

In additional or alternative embodiments, training media item 232 can be obtained (e.g., by platform 120, training data generator 131, etc.) from a set of experimental training media items (not shown). For example, an operator of platform 120 can generate (e.g., via a client device, such as client device 102) a set of experimental training media items to be used for training one or more machine learning models. The set of experimental training media items can, in some instances, can include multiple different media items that are each associated with one or more distinct characteristics. The media items of the set of experimental training media items may not be accessible to users of platform 120 and may only be generated for purpose of experimentation and/or training of one or more machine learning models. In some embodiments, platform 120 can receive (e.g., from a client device associated with an operator of platform 120) the set of experimental training media items and store each of the set of experimental training media items, and metadata associated with each if the set of experimental training media items, as a respective training media item 232. In other or similar embodiments, platform 120 and/or training data generator 131 can retrieve the set of experimental training media items from a data store configured to store the set of experimental training media items (e.g., a data store associated with an enterprise or an organization that is not publically accessible, etc.) and store each media item of the retrieved set as a respective training media item 232 at data store 230.

As indicated above, training data generator 131 can be configured to generate training data to be used to train one or more machine learning models (e.g., an encoder parameter setting model 160A, a media classifier model 160B, etc.). For purposes of example and explanation only, embodiments of the present disclosure provide that training data generator 131 can generate first training data 246 to be used for training encoder parameter setting model 160A and second training data 248 to be used for training media classifier model 160B. However, training data generator 131 can be configured to generate additional or fewer sets of training data to train encoder parameter setting model 160A and/or media classifier model 160B, in accordance with embodiments described herein. In some embodiments, first training data 246 can be generated based on different training media items 232 than are used to generate second training data 248. In other or similar embodiments, one or more training media items 232 can be used to generate both first training data 246 and second training data 248.

In some embodiments, encoder parameter setting model 160A can be trained to predict, for a given media item, a set of encoder parameter settings that satisfies a performance criterion in view of a media class associated with the given media item (referred to as an optimized set of encoder parameter settings), as described above. In some embodiments, encoder parameter setting model 160A can be further trained to predict the media class associated with the given media item, in view of one or more characteristics (e.g., an image characteristic, a content type, etc.) associated with the given media item. Media classifier model 160B can be trained to predict, for a given media item, a media class associated with the given media item in view of the one or more characteristics associated with the given media item, as indicated above.

Training data generator 131 can generate second training data 248 to train media classifier model 160B based on one or more characteristics associated with training media item 232. In some embodiments, training data generator 131 can determine the one or more characteristics associated with training media item 232 based on metadata associated with training media item 232 (i.e., stored at data store 230 as training media item metadata 234). For example, training data generator 131 can determine a spatial resolution associated with training media item 232, a frame rate associated with training media item 232, a motion activity associated with training media item 232, a type of device that generated training media item 232, an amount of noise associated with training media item 232, an image texture complexity associated with training media item 232, and/or a spatial complexity associated with training media item 232 based on training media item metadata 234. In other or similar embodiments, training data generator 131 can analyze a data stream or a signal (e.g., by demuxing and/or decoding a header of the data stream or signal, decoding a bit stream associated with data stream or signal into raw frames, estimating a motion over the raw frames to compute picture texture statistics, etc.) associated with training media item 232 to determine the spatial resolution, the frame rate, and/or the motion activity associated with training media item 232. Training data generator 131 can store the one or more determined characteristics associated with training media item 232 as training media item characteristics 236 at data store 230.

In some embodiments, training data generator 131 can generate one or more encoder statistics 238 associated with each training media item 232 used to generate second training data 248. For example, training data generator 131 can cause a respective training media item 232 to be encoded using a set of default encoder parameter settings 242. Each of the default encoder parameter settings 242 can correspond to a baseline encoder parameter setting that is provided by an operator of platform 120, in view of a specification associated with the encoder, etc. Training data generator 131 can analyze an encoded data stream or signal associated with the encoded training media item 232 and generate the encoder statistics 238 based on the analysis. For example, as indicated above, training data generator 131 can encode a training media item 232 according to one or more baseline encoder parameter settings. Each of the one or more baseline encoder parameter settings can correspond to a distinct bit rate. Training data generator 131 can generate rate-quality efficiency data associated with the encoded training media item 232, which can include, but is not limited to a Bjontegaard (BD) rate difference, an ISO-quality rate difference (i.e., corresponding to a rate-quality curve), an average ISO-quality rate difference (i.e., corresponding to an average rate-quality curve), etc. In some instances, the rate-quality efficiency data can be determined based on a PSNR, a SSIM, a perceptual media quality, and/or a psychovisual similarity associated with the first encoded data stream or signal. In some embodiments, encoder statistics 238 can additionally or alternatively include an indication of a degree of motion associated with the encoded bit stream or signal associated with training media item 232 and/or an indication of one or more mode decisions made by the media item encoder that encoded the bit stream or signal associated with training media item 232.

Training data generator 131 can generate second training data 248 by generating a mapping between training media item 232, the training media item characteristics 236, and/or the training media item encoder statistics 238. In some embodiments, training data generator 131 can provide the second training data 248 to training engine 141, in accordance with embodiments described with respect to FIG. 1. Training engine 141 (not shown in FIG. 2) can identify patterns in second training data 248 and identify clusters of data that correspond to the identified patterns. In some embodiments, training engine 141 can identify the clusters of data that correspond to the identified patterns using one or more k-means algorithms. In an illustrative example, each identified cluster of data can correspond to a training media item 232 that shares one or more common characteristics and/or one or more common encoder statistics with another training media item 232 associated with the identified cluster. In response to identifying one or more clusters of data, training engine 141 can assign a cluster identifier to each of the one or more identified clusters. Each assigned cluster identifier can correspond to a particular media class. In some embodiments, training engine 141 can store trained media classifier model 160B at data store 230, as illustrated in FIG. 2. In other or similar embodiments, training engine 141 can store trained media classifier model 160B at another data store that is coupled to system 100 (e.g., via network 104 or another network).

As indicated above, in some embodiments, encoder parameter setting model 160A can be a supervised machine learning model. In such embodiments, first training data 246 can include a set of training inputs and a set of target outputs for the set of training inputs. The set of training inputs can include an indication of a training media item 232. In some embodiments, the training media item can be the same or similar to a training media item 232 used to train media classifier model 160B. In other or similar embodiments, the training media item can be different from a training media item 232 used to train media classifier model 160B.

Media class engine 210 can be configured to determine a media class associated with training media item 232. For example, media class engine 210 can provide an indication of training media item 232 as an input to media classifier model 160B. In some embodiments, media class engine 210 can determine one or more training media item character-istics 236 (e.g., based on training media item metadata 234, etc.) and provide training media item characteristics 236 as input to media classifier model 160B. In additional or alternative embodiments, media class engine 210 can gen-erate encoder statistics 238 associated with training media item 232, in accordance with previously described embodi-ments, and provide the encoder statistics 238 as input to media classifier model 160B (i.e., with or without the indication of training media item 232 and/or training media item characteristics 236). Media classifier model 160B can provide one or more outputs that include media class data associated with training media item 232. In some embodi-ments, the media class data can include an identifier asso-ciated with a cluster of data identified by media classifier model 160B that corresponds to training media item 232. For example, the media class data can include an identifier associated with a cluster of data that corresponds to training media item characteristics 236 and/or encoder statistics 238 associated with training media item 232. In some embodi-ments, media classifier model 160B can identify the cluster of data using one or more k-means algorithms.

Media class engine 210 can determine the identifier associated with the identified cluster based on the one or more outputs of media classifier model 160B. As indicated above, a cluster of data identified by media classifier model 160B can correspond to a media class. Accordingly, the identifier determined based on the one or more outputs of media classifier model 160B can correspond to an identifier for a media class associated with training media item 232. Media class engine 210 can store an identifier for the determined media class associated with training media item 232 at data store 230 as training media item class 240.

In some embodiments, parameter engine 212 of training data generator 131 can determine a set of encoder parameter settings that satisfies a performance criterion in view of training media item class 240 (referred to as optimized encoder parameter settings 242). In some embodiments, parameter engine 212 can determine optimized encoder parameter settings 242 using optimization platform 180. As indicated above, optimization platform 180 can be config-ured to identify an optimized set of parameters for a process associated with an object. As illustrated in FIG. 2, optimi-zation platform 180 can include an optimization engine 220. Optimization engine 220 can be configured to execute one or more optimization processes associated with a given object. In some embodiments, optimization engine 220 can obtain an indication of a data object, one or more parameter settings for a process associated with the data object, and an indi-cation of a performance metric that is to be used to evaluate the process associated with the data object. Optimization engine 220 can execute a series of experiments by applying each of the one or more parameter settings to the process and evaluating an outcome of the process in view of the indi-cated performance metric. Optimization engine 220 can determine, based on the series of experiments, a parameter setting for the process that caused an outcome of the process to satisfy the indicated performance metric. In some embodi-ments, optimization engine 220 can be a distributed optimi-zation engine. In such embodiments, one or more portions of optimization engine 220 can execute the series of experi-ments using computing resources that reside at one or more computing devices (e.g., server machines, etc.).

In some embodiments, parameter engine 212 can provide an indication of training media item 232, training media item characteristics 236, training media item encoder statistics 238, training media item class 240, and/or default encoder parameter settings 242 to optimization engine 220. Param-eter engine 212 can also provide an indication of a perfor-mance criterion 244 to optimization engine 220, in some embodiments. As indicated above, a performance criterion 244 can correspond to a bit rate savings performance crite-rion, a peak signal-to-noise ratio (PSNR) criterion, a struc-tural similarity index (SSIM) criterion, a perceptual media quality criterion, and/or a psychovisual similarity criterion. In additional or alternative embodiments, parameter engine 212 may not provide an indication of training media item characteristics 236, training media item encoder statistics 238, training media item class 240, default encoder param-eter settings 242, and/or performance criterion 244 to opti-mization engine 220. Instead, parameter engine 212 may provide optimization engine 220 with an indication of training media item 232 and parameter engine 212 may retrieve training media item characteristics 236, training media item encoder statistics 238, training media item class 240, default encoder parameter settings 242, and/or perfor-mance criterion 244 from data store 230.

Optimization engine 220 can design and execute a series of experiments to determine the optimized encoder param-eter settings 250 associated with training media item 232. In an illustrative example, optimization engine 220 can design and execute a first experiment to encode a first data stream or signal associated with the training media item 232 using default set of encoder parameter settings 242 Optimization engine 220 can generate optimization statistics by analyzing the first encoded data stream or signal. In some embodi-ments, the optimization statistics can include rate-quality efficiency data, including but not limited to a Bjontegaard (BD) rate difference, an ISO-quality rate difference (i.e., corresponding to a difference between two or more rate-quality curves associated with the same or similar quality level, an average ISO-quality rate difference (i.e., corre-sponding to an average rate-quality curve difference), etc. In some instances, the rate-quality efficiency data can be deter-mined based on a PSNR, a SSIM, a perceptual media quality, and/or a psychovisual similarity associated with the first encoded data stream or signal.

Optimization engine 220 can determine whether the first encoded data stream or signal satisfies performance criterion 244 based on the generated optimization statistics. For example, as indicated above, the performance criterion 244 can be a PSNR criterion. The optimization statistics gener-ated for the first encoded data stream or signal can include a BD rate difference, an ISO-quality rate difference, and/or an average ISO-quality rate difference that is determined based on a PSNR associated with the first encoded data stream or signal. Optimization engine 220 can determine whether the BD rate difference, the ISO-quality rate differ-ence, and/or the average ISO-quality rate difference satisfies the PSNR criterion (e.g., corresponds to a target value, etc.).

In response to determining that the BD rate difference, the ISO-quality rate difference, and/or the average ISO-quality rate difference satisfies the PSNR criterion, optimization engine 220 can designate the default encoder parameter settings 242 as optimized encoder parameter settings 250. In response to determining that the BD rate difference, the ISO-quality rate difference, and/or the average ISO-quality rate difference does not satisfy the PSNR criterion, optimization engine 220 can modify default encoder parameter settings 242 to generate modified encoder parameter settings. The modified encoder parameter settings can be similar to the default encoder parameter settings 242, except that a value of one or more of the modified encoder parameter settings is different (e.g., is larger, is smaller, etc.) than a corresponding parameter setting of the default encoder parameter settings.

Optimization engine 220 can design and execute a second experiment to encode a second data stream or signal associated with the training media item 232 using the modified set of parameter settings, as described above. Optimization engine 220 can determine whether the second encoded data stream or signal satisfies performance criterion 244 based on optimization statistics associated with the second encoded data stream or signal, as described above. Responsive to determining that the second encoded data stream or signal does not satisfy performance criterion 244, optimization engine 220 can update the modified set of parameter settings, as described above. In some embodiments, optimization engine 220 can continue to design and execute experiments to encode a data stream or signal associated with the training media item 232 using updated encoder parameter settings until optimization engine 220 determines that an encoded data stream or signal satisfies performance criterion 244. Responsive to determining that an encoded data stream or signal associated with training media item 232 satisfies performance criterion 244, optimization engine 220 can designate the set of encoder settings used to encode the data stream or signal as optimized encoder parameter settings 250. Optimization engine 220 can provide an indication of the designated optimized encoder parameter settings 250 associated with the training media item 232 to parameter engine 212, in some embodiments. Training data generator 131 can include the optimized encoder parameter settings 250 (i.e., provided by optimization engine 220) in the set of target outputs of first training data 246.

In additional or alternative embodiments, encoder parameter setting model 160A can be an unsupervised machine learning model. In such embodiments, first training data 246 can include a set of training inputs, which can include an indication of training media item 232, an indication of training media item characteristics 236, an indication of training media item encoder statistics 238, and/or optimized encoder parameter settings 250. Each of training media item characteristics 236, training media encoder statistics 238, and/or optimized encoder parameter settings 250 can be obtained in accordance with previously described embodiments. Training data generator 131 can provide first training data 246 to training engine 141 to train encoder parameter setting model 160A, as described above. In some embodiments, training engine 141 (not shown in FIG. 2) can identify patterns in first training data 246 and identify clusters of data that correspond to the identified patterns (e.g., using one or more k-means algorithms). In an illustrative example, each identified cluster of data can correspond to a training media item 232 that shares one or more common characteristics and/or one or more common encoder statistics with another training media item 232 associated with the identified cluster. In response to identifying one or more clusters of data, training engine 141 can assign a cluster identifier to each of the one or more identified clusters. Each assigned cluster identifier can correspond to a particular media class, as described with respect to media classifier model 160B. Training engine 141 can also associate optimized encoder parameter settings 250 with a respective identified cluster, in view of the identified patterns. In some embodiments, training engine 141 can store trained encoder parameter setting model 160A at data store 230, as illustrated in FIG. 2. In other or similar embodiments, training engine 141 can store trained encoder parameter setting model 160A at another data store that is coupled to system 100 (e.g., via network 104 or another network).

Figure 3:
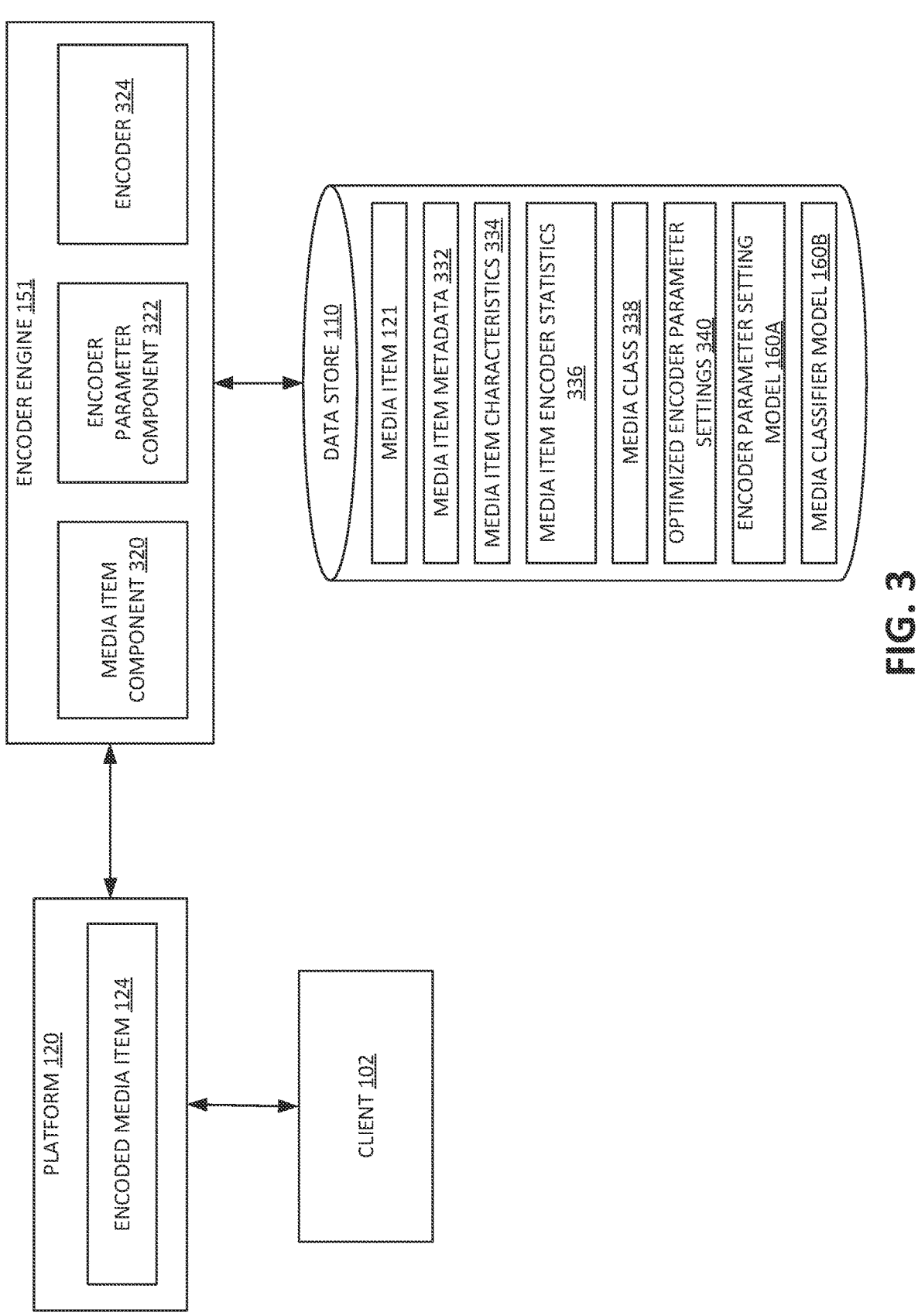
FIG. 3 is a block diagram illustrating a platform and an encoding engine for the platform, in accordance with implementations of the disclosure.

FIG. 3 is a block diagram illustrating a platform 120 and an encoding engine 151 for the platform 120, in accordance with implementations of the disclosure. In some embodiments, a client device 102 can transmit a request to platform 120 to access a media item 121 hosted by platform 120. In some embodiments, platform 120 can identify the requested media item 121 from data store 110 and can provide an indication of the identified media item 121 to media item component 320 of encoder engine 151. In other or similar embodiments, media item component 320 can identify the requested media item 121 from data store 110.

In some embodiments, media item component 320 can determine one or more characteristics 334 associated with media item 121. In some embodiments, media item component 320 can determine the one or more characteristics 334 based on media item metadata 332, as described above. In other or similar embodiments, media item component 320 can determine the one or more characteristics 334 by analyzing a data stream or signal associated with media item 121. In some embodiments, media item component 320 can also determine encoder statistics 336 associated with media item 121. For example, media item component 320 can encode a data stream or signal associated with media item 121 (e.g., using a default set of encoder parameter settings) and generate encoder statistics 336 based on the analysis (e.g., as described with respect to training media item encoder statistics 238 of FIG. 2).

Media item component 320 can determine a media class 338 associated with media item 121, in some embodiments. For example, media item component 320 can provide an indication of media item 121 and/or one or more characteristics 334 associated with media item 121 as input to media classifier model 160B. Media classifier model 160B can be trained to predict a media class associated with a given media item, in accordance with embodiments described with respect to FIG. 2. Media item component 320 can obtain one or more outputs of media classifier model 160B and determine a media class 338 associated with the media item 121 based on the one or more obtained outputs, in accordance with previously described embodiments. As illustrated in FIG. 3, media item component 320 can store media item metadata 332, media item characteristics 334, media item encoder statistics 336, and/or media class 338 at data store 110.

In some embodiments, encoder parameter component 322 can determine optimized encoder parameter settings 340 using encoder parameter setting model 160A. Encoder parameter setting model 160A can be trained by training engine 141 using training data (e.g., first training data 246) generated by training data generator 131, in accordance with embodiments described with respect to FIG. 2. In some embodiments, encoder parameter component 322 can provide an indication of media item 121 as input to encoder parameter setting model 160A. In additional or alternative embodiments, encoder parameter component 322 can provide an indication of media item characteristics 334, media item encoder statistics 336, and/or media class 338 as input to encoder parameter setting model 160A. In other or similar embodiments, encoder parameter setting model 160A can obtain media item characteristics 334, media item encoder statistics 336, and/or media class 338 from, data store 110. In yet other or similar embodiments, encoder parameter setting model 160A can determine media class 338 based on media item characteristics 334 and/or media item encoder statistics 336, as described above.

Encoder parameter component 322 can obtain one or more outputs of encoder parameter setting model 160A. In some embodiments, the one or more obtained outputs can include encoder data that identifies one or more sets of encoder parameter settings and an indication of a level of confidence that a respective set of encoder parameter settings satisfies a performance criterion in view of media class 338. Encoder parameter component 322 can identify a respective set of encoder parameter settings that is associated with a level of confidence that satisfies a confidence criterion (e.g., exceeds a threshold level of confidence, and/or is higher than a level of confidence associated with other sets of encoder parameter settings, etc.). Responsive to identifying the set of encoder parameter settings that is associated with the level of confidence that satisfies the confidence criterion, encoder parameter component 322 can store the set of encoder parameter settings at data store 110 as optimized encoder parameter settings 340. In additional or alternative embodiments, encoder parameter component 322 can provide the optimized encoder parameter settings 340 to encoder 324.

Encoder 324 can be configured to encode a data stream or signal associated with a media item stored at data store 110. In some embodiments, encoder 324 can be a codec. Encoder 324 can obtain the optimized encoder parameter settings 340 (e.g., from data store 110, from encoder parameter component 322, etc.) and can encode a data stream or signal associated with the requested media item 121. The encoded data stream or signal can correspond to encoded media item 124. Encoder engine 151 can provide encoded media item 124 to platform 120, which can provide encoded media item 124 to client device 102 (e.g., via network 104). As described above, client device 102 can include an encoder and/or a decoder, in such embodiments. The encoder and/or the decoder at client device 102 can decode encoded media item 124 to generate one or more decoded data streams or signals associated with media item 121. Client device 102 can provide the media item 121 to a user associated with client device 102 (e.g., via a UI) based on the decoded data streams or signals associated with media item 121.

It should be noted that although embodiments of the present disclosure are directed to encoding a data stream or signal associated with a media item 121 in response to receiving a request from a client device 102, encoding engine 151 can cause a data stream or signal associated with a media item 121 to be encoded at any time. For example, client device 102 can generate a media item 121 and transmit the media item 121 to platform 120, as described above. Encoding engine 151 can determine the optimized encoder parameter settings 340 associated with the media item 121 and encode the media item 121 based on the optimized encoder parameter settings 340 before a request to access the media item 121 is received. In some embodiments, encoding engine 151 can store encoded media item 124 at data store

110 and platform 120 can provide encoded media item 124 to a client device 102 in response to a request for a media item 121.

FIG. 4 depicts a flow diagram of a method 400 for training a machine learning model to predict an optimized set of encoder parameter settings, in accordance with implementations of the present disclosure. FIG. 5 depicts a flow diagram of a method 500 for obtaining an optimized set of encoder parameter settings for a media item to be shared with one or more users of a platform (e.g., a content sharing platform, etc.), in accordance with implementations of the present disclosure. Methods 400 and 500 may be performed by processing logic that may include hardware (circuitry, dedicated logic, etc.), software (e.g., instructions run on a processing device), or a combination thereof. In one implementation, some or all the operations of methods 400 and 500 may be performed by one or more components of system 100 of FIG. 1.

At block 410, processing logic initializes training set T to { }. At block 420, processing logic determines a media class associated with a training media item. In some embodiments, processing logic can determine the media class associated with the training media item by determining one or more characteristics and/or encoder statistics associated with the training media item and providing the one or more determined characteristics and/or encoder statistics as input to a media classifier model (e.g., media classifier model 160B). Processing logic can determine the media class based on one or more outputs of the media classifier model.

At block 430, processing logic determines a set of encoding parameter settings for a training media item that satisfies a performance criterion in view of a media class associated with the training media item. The performance criterion can correspond to a bitrate savings performance criterion, a PSNR criterion, a SSIM criterion, a perceptual media quality criterion, or a psychovisual similarity criterion. In some embodiments, processing logic can provide the training media item, an indication of the one or more characteristics associated with the training media item, an indication of a default set of encoder parameter settings, and an indication of the performance criterion to an optimization platform. The optimization platform can be configured to determine, for a given object, one or more given characteristics associated with the given object, an indication of a default set of encoder parameter settings, and an indication of a given performance criterion, a set of parameter settings that satisfy the given performance criterion in view of the one or more given characteristics associated with the given object. Processing logic can receive, form the optimization platform, an indication of the set of encoding parameter settings for the training media item that satisfies the performance criterion in view of the particular media class, in accordance with previously described embodiments.

At block 440, processing logic generates an input/output mapping, the input based on one or more characteristics associated with the training media item and the output based on the determined set of encoding parameter settings that satisfies the performance criterion in view of the associated media class. In some embodiments, processing logic can generate the input/output mapping based on the determined media class associated with the training media item and the determined set of encoder parameter settings. At block 450, processing logic adds the input/output mapping to training set T. At block 460, processing logic determines whether set T is sufficient for training. In response to processing logic determining that set T is sufficient for training, method 400 can proceed to block 470. In response to processing logic determining that set T is not sufficient for training, method 400 can return to block 420. At block 470, processing logic provides training set T to train a machine learning model.

As discussed above, FIG. 5 depicts a flow diagram of a method 500 for obtaining an optimized set of encoder parameter settings for a media item to be shared with one or more users of a platform, in accordance with implementations of the present disclosure.

At block 510, processing logic identifies a media item to be provided to one or more users of a platform. The media item can be associated with a media class of multiple media classes. In some embodiments, processing logic can determine the media class associated with the media item. For example, processing logic can obtain one or more characteristics associated with the media item. The characteristics can correspond to at least one of an image characteristic (e.g., a spatial resolution, a frame rate, a motion activity, etc.) associated with the media item and/or a content type associated with the media item. In some embodiments, processing logic can also determine one or more encoder statistics associated with the media item. For example, processing logic can encode the media item according to a default set of encoder parameter settings and can determine one or more encoding statistics, an indication of a degree of motion associated with the encoded media item, and/or an indication of one or more mode decisions made by the encoder while encoding the media item. Processing logic can provide the one or more characteristics and/or the one or more encoder statistics as input to a media classifier model (e.g., model 160B) and determine the media class associated with the media item based on one or more outputs of the media classifier model.

At block 520, processing logic provides an indication of the identified media item as input to a machine learning model. In some embodiments, processing logic can also provide an indication of one or more characteristics associated with the media item, one or more encoding statistics associated with the media item, and/or a media class associated with the media item as input to the machine learning model. At block 530, processing logic obtains one or more outputs of the machine learning model. The one or more outputs include encoder data identifying one or more sets of encoder parameter settings and, for each of the one or more sets of encoder parameter settings, an indication of a level of confidence that a respective set of encoder parameter settings satisfies a performance criterion in view of the particular media class associated with the identified media item. At block 540, processing logic identifies, based on the one or more obtained outputs, the respective set of encoder parameter settings associated with a level of confidence that satisfies a confidence criterion. At block 550, processing logic causes the identified media item to be encoded using the respective set of encoder parameter settings.

Figure 6:
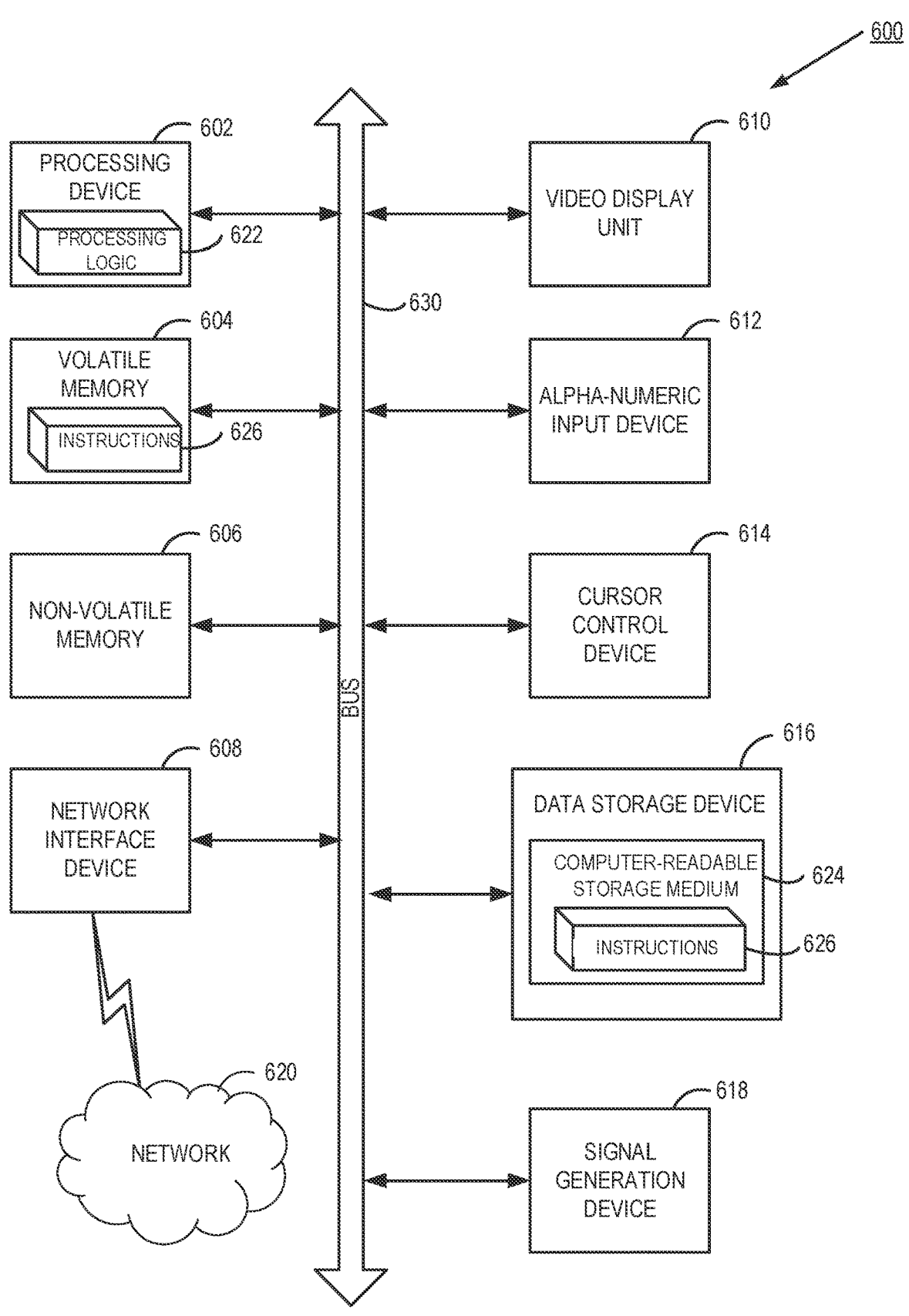
FIG. 6 is a block diagram illustrating an exemplary computer system, in accordance with implementations of the present disclosure.

FIG. 6 is a block diagram illustrating an exemplary computer system, in accordance with implementations of the present disclosure. The computer system 600 can be the server machine 130 or client devices 102A-N in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processing device (processor) 602, a main memory 604 (e.g., read-only memory (ROM), flash memory, dynamic random access memory (DRAM) such as synchronous DRAM (SDRAM), double data rate (DDR SDRAM), or DRAM (RDRAM), etc.), a static memory 606 (e.g., flash memory, static random access memory (SRAM), etc.), and a data storage device 618, which communicate with each other via a bus 640.

Processor (processing device) 602 represents one or more general-purpose processing devices such as a microprocessor, central processing unit, or the like. More particularly, the processor 602 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 can also be one or more special-purpose processing devices such as an application specific integrated circuit (ASIC), a field programmable gate array (FPGA), a digital signal processor (DSP), network processor, or the like. The processor 602 is configured to execute instructions 605 (e.g., for predicting channel lineup viewership) for performing the operations discussed herein.

The computer system 600 can further include a network interface device 608. The computer system 600 also can include a video display unit 610 (e.g., a liquid crystal display (LCD) or a cathode ray tube (CRT)), an input device 612 (e.g., a keyboard, and alphanumeric keyboard, a motion sensing input device, touch screen), a cursor control device 614 (e.g., a mouse), and a signal generation device 620 (e.g., a speaker).

The data storage device 618 can include a non-transitory machine-readable storage medium 624 (also computer-readable storage medium) on which is stored one or more sets of instructions 605 (e.g., for obtaining optimized encoder parameter settings) embodying any one or more of the methodologies or functions described herein. The instructions can also reside, completely or at least partially, within the main memory 604 and/or within the processor 602 during execution thereof by the computer system 600, the main memory 604 and the processor 602 also constituting machine-readable storage media. The instructions can further be transmitted or received over a network 630 via the network interface device 608.

In one implementation, the instructions 605 include instructions for designating a verbal statement as a polling question. While the computer-readable storage medium 624 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/ or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:

identifying a media item to be provided to one or more users of a platform, wherein the identified media item is associated with a media class of a plurality of media classes;

providing an indication of the identified media item as input to a machine learning model trained based on historical encoding data to predict, for a given media item, a set of encoder parameter settings that satisfy a performance criterion in view of a respective media class associated with the given media item, the historical encoding data comprising a prior set of encoder parameter settings that satisfied the performance criterion with respect to a prior media item associated with the respective media class;

obtaining one or more outputs of the machine learning model, wherein the one or more outputs identify:

one or more sets of encoder parameter settings, and for each of the one or more sets of the encoder parameter settings, a level of confidence that a respective set of encoder parameter settings satisfies the performance criterion in view of the media class associated with the identified media item;

identifying, based on the one or more outputs of the machine learning model, at least one respective set of encoder parameter settings having a level of confidence that satisfies a confidence criterion, wherein the level of confidence indicates whether the set of encoder parameter settings satisfies the performance criterion in view of the media class associated with the identified media item; and causing the identified media item to be encoded using the identified respective set of encoder parameter settings.

2. The method of claim 1, further comprising:

obtaining encoding statistics associated with the identified media item based on an initial encoding of the identified media item by a media item encoder; and providing the obtained encoding statistics as an additional input to the machine learning model.

3. The method of claim 2, wherein obtaining the encoding statistics associated with the identified media item comprises:

providing the identified media item and a default set of encoder parameter settings as input to the media item encoder;

obtaining an encoded bit stream based on one or more outputs of the media item encoder; and determining a value associated with the encoding statistics associated with the encoded bit stream.

4. The method of claim 1, wherein each of the plurality of media classes corresponds to at least one of a distinct image characteristic or a distinct content category.

5. The method of claim 4, wherein the image characteristic associated with the media item corresponds to at least one of a spatial resolution associated with the identified media item, a frame rate associated with the identified media item, a motion activity associated with the identified media item, a type of device that generated the identified media item, an amount of image noise associated with the identified media item, an image texture complexity associated with the identified media item, or a spatial complexity associated with the identified media item.

6. The method of claim 1, wherein identifying the at least one respective set of encoder parameter settings having the level of confidence that satisfies the confidence criterion comprises at least one of:

determining that the at least one respective set of encoder parameter settings, of the one or more sets of encoder parameter settings, is associated with the level of confidence that satisfies the confidence criterion, or determining that another set of encoder parameter settings, of the one or more sets of encoder parameter settings, is associated with another level of confidence that does not satisfy the confidence criterion.

7. The method of claim 1, wherein the historical encoding data comprises (i) a training input comprising the respective media class of the prior media item and (ii) a target output for the training input, the target output comprising an indication of the prior set of encoder parameter settings that satisfied the performance criterion with respect to the prior media item.

8. The method of claim 1, further comprising:

determining the media class associated with the identified media item; and providing the determined media class as an additional input to the machine learning model.

9. The method of claim 8, wherein determining the media class associated with the identified media item comprises:

obtaining one or more characteristics associated with the identified media item, wherein the one or more characteristics correspond to at least one of an image characteristic associated with the identified media item or a content category associated with the identified media item; and providing the one or more characteristics as input to an additional machine learning model, wherein the additional machine learning model is trained to predict, based on given input characteristics associated with a respective media item, a particular media class, of the plurality of media classes, that corresponds to the respective media item in view of the given input characteristics, wherein the media class associated with the identified media item is determined based on one or more outputs of the additional machine learning model.

10. The method of claim 1, wherein the performance criterion corresponds to at least one of a bitrate savings performance criterion, a peak signal-to-noise ratio (PSNR) criterion, a structural similarity index (SSIM) criterion, a perceptual media quality criterion, or a psychovisual similarity criterion.

11. A system comprising:

a memory device; and a set of one or more processors coupled to the memory device, the set of one or more processors to perform operations comprising:

identifying a media item to be provided to one or more users of a platform, wherein the identified media item is associated with a media class of a plurality of media classes;

providing an indication of the identified media item as input to a machine learning model trained based on historical encoding data to predict, for a given media item, a set of encoder parameter settings that satisfy a performance criterion in view of a respective media class associated with the given media item, the historical encoding data comprising a prior set of encoder parameter settings that satisfied the performance criterion with respect to a prior media item associated with the respective media class;

obtaining one or more outputs of the machine learning model, wherein the one or more outputs identify:

one or more sets of encoder parameter settings and, for each of the one or more sets of encoder parameter settings, and for each of the one or more sets of the encoder parameter settings, a level of confidence that a respective set of encoder parameter settings satisfies the performance criterion in view of the media class associated with the media item;

identifying, based on one or more outputs of the machine learning model, at least one respective set of encoder parameter settings having a level of confidence that satisfies a confidence criterion, wherein the level of confidence indicates whether the set of encoder parameter settings satisfies the performance criterion in view of the media class associated with the identified media item; and causing the identified media item to be encoded using the identified at least one respective set of encoder parameter settings.

12. The system of claim 11, wherein the operations further comprise:

obtaining encoding statistics associated with the identified media item based on an initial encoding of the identified media item by a media item encoder; and providing the obtained encoding statistics as an additional input to the machine learning model.

13. The system of claim 12, wherein obtaining the encoding statistics associated with the identified media item comprises:

providing the identified media item and a default set of encoder parameter settings as input to the media item encoder;

obtaining an encoded bit stream based on one or more outputs of the media item encoder; and determining a value associated with the encoding statistics associated with the encoded bit stream.

14. The system of claim 11, wherein each of the plurality of media classes corresponds to at least one of a distinct image characteristic or a distinct content category.

15. The system of claim 14, wherein the image characteristic associated with the media item corresponds to at least one of a spatial resolution associated with the identified media item, a frame rate associated with the identified media item, a motion activity associated with the identified media item, a type of device that generated the identified media item, an amount of image noise associated with the identified media item, an image texture complexity associated with the identified media item, or a spatial complexity associated with the identified media item.

16. The system of claim 11,
wherein identifying the at least one respective set of encoder parameter settings having the level of confidence that satisfies the confidence criterion comprises at least one of:
determining that the at least one respective set of encoder parameter settings, of the one or more sets of encoder parameter settings, is associated with the level of confidence that satisfies the confidence criterion, or
determining that another set of encoder parameter settings, of the one or more sets of encoder parameter settings, is associated with another level of confidence that does not satisfy the confidence criterion.

17. The system of claim 11, wherein the historical encoding data comprises (i) a training input comprising the respective media class of the prior media item and (ii) a target output for the training input, the target output comprising an indication of the prior set of encoder parameter settings that satisfied the performance criterion with respect to the prior media item.

18. A non-transitory computer readable storage medium comprising instructions for a server that, when executed by a set of one or more processors, cause the set of one or more processors to perform operations comprising:
identifying a media item to be provided to one or more users of a platform, wherein the identified media item is associated with a media class of a plurality of media classes;
providing an indication of the identified media item as input to a machine learning model trained based on historical encoding data to predict, for a given media item, a set of encoder parameter settings that satisfy a performance criterion in view of a respective media class associated with the given media item, the historical encoding data comprising a prior set of encoder parameter settings that satisfied the performance criterion with respect to a prior media item associated with the respective media class;
obtaining one or more outputs of the machine learning model, wherein the one or more outputs identify:
one or more sets of encoder parameter settings, and
for each of the one or more sets of the encoder parameter settings, a level of confidence that a respective set of encoder parameter settings satisfies the performance criterion in view of the media class associated with the identified media item;
identifying, based on one or more outputs of the machine learning model, at least one respective set of encoder parameter settings having a level of confidence that satisfies a confidence criterion, wherein the level of confidence indicates whether the set of encoder parameter settings satisfies the performance criterion in view of the media class associated with the identified media item; and
causing the identified media item to be encoded using the identified respective set of encoder parameter settings.

19. The non-transitory computer readable storage medium of claim 18, wherein the operations further comprise:
obtaining encoding statistics associated with the identified media item based on an initial encoding of the identified media item by a media item encoder; and
providing the obtained encoding statistics as an additional input to the machine learning model.

20. The non-transitory computer readable storage medium of claim 19, wherein obtaining the encoding statistics associated with the identified media item comprises:
providing the identified media item and a default set of encoder parameter settings as input to the media item encoder;
obtaining an encoded bit stream based on one or more outputs of the media item encoder; and
determining a value associated with the encoding statistics associated with the encoded bit stream.

* * * * *